United States Patent [19]

Francis

[11] Patent Number: 4,550,676

[45] Date of Patent: Nov. 5, 1985

[54] ELAPSED TIME INDICATOR

[75] Inventor: Alan W. Francis, Racine County, Wis.

[73] Assignee: S. C. Johnson & Son, Inc., Racine, Wis.

[21] Appl. No.: 525,928

[22] Filed: Aug. 25, 1983

[51] Int. Cl.$^4$ .............................................. G01D 21/00

[52] U.S. Cl. ................................. 116/206; 252/408.1; 252/962; 252/963; 368/89; 436/2

[58] Field of Search ........................ 116/206, 207, 308; 422/55, 56, 58; 368/89, 327; 252/522 A, 962, 963, 408.1; 374/102, 106; 436/2

[56] References Cited

U.S. PATENT DOCUMENTS 2,552,477 5/1951 Cole .................................... 374/102
3,290,669 12/1966 Mews .................................. 116/206
3,724,360 4/1973 Kliewer et al. ...................... 116/207
4,020,156 4/1977 Murray et al. .................. 252/522 A
4,062,649 12/1977 Kuderna et al. ........................ 436/2
4,137,049 1/1979 Couch et al. ......................... 374/106
4,146,566 3/1979 Gaiser .............................. 252/408.1

FOREIGN PATENT DOCUMENTS 0012654 1/1983 Japan .............................. 252/522 A

*Primary Examiner*—Charles Frankfort
*Assistant Examiner*—W. Morris Worth

[57] ABSTRACT

An elapsed time indicator in which an indicator, such as a flowable colorant, is releasably contained within an enclosure at least a portion of which is a volatilizable, preferably sublimable, substance.

17 Claims, 4 Drawing Figures

ELAPSED TIME INDICATOR

FIELD OF THE INVENTION

This invention relates to elapsed time indicators. More specifically, this invention relates to elapsed time indicators of the type usable to signal replacement of an exhausted item, such as a vapor-dispensing device for air treatment.

BACKGROUND OF THE INVENTION

This invention will be described primarily by reference to specific embodiments useful with devices for dispensing air-treating vapors, such as air fresheners and insecticides, by evaporation and/or migration of air-treating substances through retention materials. The elapsed time indicator of this invention has particular usefulness in such applications, but it is to be understood that this invention has a number of other applications.

A great variety of devices have been developed to dispense air-treating vapors. Some of such devices dispense the vapors of an air-treating composition which is contained within and/or behind a polymeric material through which the air-treating composition migrates until released as a vapor at an outer surface. One product of this type includes perfume-impregnated composites of ethylene and polar monomer copolymers, such as vinyl acetate and ethyl acrylate. (See, for example, U.S. Pat. No. 4,095,031, entitled "Perfume Copolymers of Ethylene and Polar Monomer," issued in the name of Edward Jacob Engle on June 13, 1978.) Such plastic composites may be formed into beads which can be made to tumble in a rotatable vented container to emit air-treating vapors.

One problem or drawback in products of this type is that the product user cannot easily determine when the available air-treating composition is sufficiently depleted to require replacement. Therefore, it is desirable to have some sort of means to prompt replacement.

A variety of elapsed time indicators have been disclosed, including the following:

U.S. Pat. No. 3,018,611 discloses a complex device having an air inflow restriction and an oxygen-reactive material which gradually changes in color when it comes in contact with inflowing air. A predetermined period of time is known to have elapsed when the color of the strip has changed sufficiently.

U.S. Pat. No. 3,480,402 discloses a time indicator having an absorbent carrier holding a chemical compound which changes color upon exposure to oxygen. The compound is protected from the atmosphere by a layer through which atmospheric oxygen can be controllably diffused over a predetermined period of time.

U.S. Pat. No. 3,520,124 discloses the use of chemical or physical reactions of two materials to produce an abrupt color change when the reaction is complete. The reaction is initiated by removal of a barrier.

U.S. Pat. No. 3,996,007 discloses a time-temperature indicator having a rate-controlling film formed into a sealed pouch containing a gas-generating means in an ampule surrounded by a porous protective layer. The gas may be generated by vaporization, sublimation, or otherwise. When the gas is released, it reacts with an indicator composition to produce a color change.

U.S. Pat. No. 4,028,876 discloses apparatus for visually indicating elapsed time by a color change occurring on the reaction of two chromophoric compounds that are combined with one another through a matrix. The color change is gradual, rather than abrupt, and color comparisons must be made to judge when a predetermined time period has passed.

U.S. Pat. No. 4,128,508 discloses a color change perfume system using an acid or base which volatilizes at about the same rate as the perfume. The volatilization of the acid or base causes a pH indicator to change color as the perfume is exhausted.

U.S. Pat. No. 4,137,049 discloses a complex elapsed time indicator including two reactive chemicals, a pH change indicator, and a container which houses a frangible capsule and a porous carrier. The capsule holds a vapor-generating chemical. The porous carrier is impregnated with the other reactive chemical, the pH indicator, and a gel-forming agent. Vapor from the vapor-generating capsule gradually moves through and reacts in the carrier causing a gradual color change.

U.S. Pat. Nos. 4,195,055 and 4,195,057 disclose vapor-phase moving-boundary time indicators in which vapor permeating through a porous substrate which is coated with an indicating solid provides a visible moving boundary between two colors.

U.S. Pat. Nos. 4,195,056 and 4,195,058 disclose time-temperature indicators of a type in which a vapor-permeable barrier is positioned between a vapor and an indicator, all within an impermeable container.

U.S. Pat. No. 4,212,153 discloses a laminated indicator which utilizes the migration of a dye or the migration of an acid or base to interact with a pH indicator The color change occurring in this product is gradual, rather than abrupt.

U.S. Pat. No. 4,229,813 discloses an indicator which uses the migration of silicone oil along an absorbent strip to measure elapsed time. When the oil makes contact with ink, the color of the strip is changed. The device is said to be substantially unaffected by temperature.

U.S. Pat. No. 4,248,597 discloses a device having a pH color indicator. A color change occurs as the concentration of a removable substance having acidic or basic groups within a porous matrix diminishes by passing through a permeable film.

There are a number of disadvantages with devices of the prior art. For example, many of the prior elapsed time indicators fail to provide a sufficiently abrupt indication that a predetermined time period has elapsed. An abrupt color change is generally preferred over a change which is gradual over a long period of time. Gradual changes often require comparisons against a color standard to judge when sufficient time has elapsed. Many time indicator devices of the prior art are often too temperature or humidity sensitive to be useful under widely varying temperature and humidity conditions. Many devices of the prior art are very complex and expensive, and not given to simple use with vapor-dispensing products.

There is a need for a simple, reliable elapsed time indicator which can be used with vapor-dispensing products of various kinds.

SUMMARY OF THE INVENTION

This invention provides a reliable elapsed time indicator overcoming the disadvantages of the prior art. The device is simple in construction and operation and can provide an accurate indication of elapsed time over wide temperature and humidity ranges. Furthermore, the device provides a relatively abrupt indication that the predetermined time period has elapsed. The product is particularly useful with vapor-dispensing devices of the type described above.

The invention includes an indicator, preferably a flowable colorant such as a powdered dye, and an enclosure for such indicator at least a portion of such enclosure being a volatilizable substance. Other types of indicators can be used, as will be explained later. After volatilization of the substance forming part or all of the enclosure for the flowable colorant or other indicator means, the indicator becomes effective.

The indicator preferably becomes effective by being physically released from the enclosure through the opening formed in the enclosure by volatilization of the volatilizable substance which formed at least a portion of the enclosure. If the indicator is a flowable colorant, it will flow from the enclosure to contact and color a surface which can be viewed readily by an observer, thus prompting some action by the observer.

The volatilizable substance is preferably a sublimable substance. Highly preferred sublimable substances include para-dichlorobenzene, 2,4,6-triisopropyl-1,3,5-trioxane, camphor, and napthalene. Para-dichlorobenzene is most preferred.

As noted, the enclosure may be made entirely of the volatilizable substance, or the volatilizable substance may form a portion of the enclosure. In the latter case, which is preferred, a volatilizable plug may close an opening in a container. Such container is preferably an open-ended capsule having walls which are impermeable to the capsule contents. The flowable colorant or other indicator is placed within the capsule remote from its open end and is covered by the volatilizable plug material. The flowable colorant or other indicator cannot be released from the capsule until after volatilization of the plug.

The flowable colorant is preferably in a core which in turn is within the enclosure. This can serve to prevent the sudden dumping of colorant which might cause it to reach unintended surfaces. In such cases, the colorant is intermixed with and held in a sublimable core substance. After volatilization (e.g., sublimation) of the volatilizable portion of the enclosure, the sublimable core substance will in turn volatilize and gradually release the flowable colorant as it does so. While such release is "gradual," it nevertheless is abrupt when compared with indicators which, e.g., change color over the whole life of the product.

When the flowable colorant is in a core, intermixed with and held in a sublimable core substance, such sublimable core substance is preferably rather quickly sublimable. Preferred sublimable core substances include naphthlene, camphor, and para-dichlorobenzene.

After the time-measuring volatilization of the enclosure has occurred, in preferred embodiments the indicator is released such that it can move away from the enclosure. If the indicator is a flowable colorant, it will be released to contact a deposit surface adjacent to the enclosure means. Such deposit surface can be the outer surfaces of plastic beads which are impregnated with an air-treating composition. The flowable colorant will quickly color such beads and thus provide a clear visual indication that replacement of the beads is necessary.

In such cases, it is highly preferable that the deposit surface, such as the beads, include a solvent for the flowable colorant. When this is the case, the color will become evenly "attached" very well to the deposit surface and any possibility of colorant flowing away from the device entirely and staining adjacent surfaces will be minimized or eliminated.

While the indicator is preferably a flowable colorant, such as a powdered dye, it could instead be a relatively heavy object such as a small metal ball which would be released from the enclosure and drop into a position which would indicate that the predetermined time period has passed. Alternatively, the ball (or other object) could strike an object and make an audible sound or otherwise actuate some other indicator device.

OBJECTS OF THE INVENTION

It is an object of this invention to provide an elapsed time indicator overcoming problems and drawbacks of prior elapsed time indicators.

Another object of this invention is to provide an elapsed time indicator which is relatively simple in operation and construction and relatively unaffected in its operation by temperature and humidity variations.

Another object of this invention is to provide an elapsed time indicator giving a rather abrupt indication that a predetermined time has elapsed.

Still another object of this invention is to provide an elapsed time indicator which is particularly suitable for use with dispensers for air-treating vapors.

These and other important objects and advantages of the invention will be apparent from the descriptions herein and from the accompanying drawings wherein:

DETAILED DESCRIPTION OF THE PREFERRED EMBODIMENTS

The figures illustrate an elapsed time indicator 10 in accordance with this invention. Elapsed time indicator 10 is in the form of a capsule 12 having a container wall 14 and a cover 16 which are made of a material impermeable to the contents of capsule 12. When cover 16 is removed from container wall 14, elapsed time indicator 10 is made effective; that is, the measurement of a predetermined time period commences.

A preferred material for container wall 14 and cover 16 is a rigid gelatin of the type widely used in the pharmaceutical industry. A wide variety of other materials could be used, including metals, glass, and various plastics. A desirable capsule size is dependent on many factors; however, for many applications #00 capsules are acceptable. A wide variety of other types of containers, in various sizes and shapes, could be used.

Figure 1:
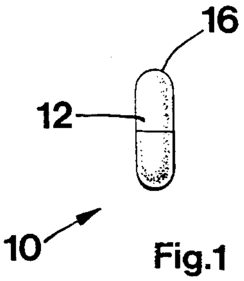
FIG. 1 is a side elevation of a preferred elapsed time indicator according to this invention.
Figure 2:
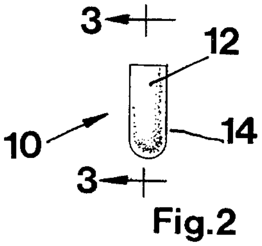
FIG. 2 is another side elevation of the device, but with its cover removed such that it is ready for use.
Figure 3:
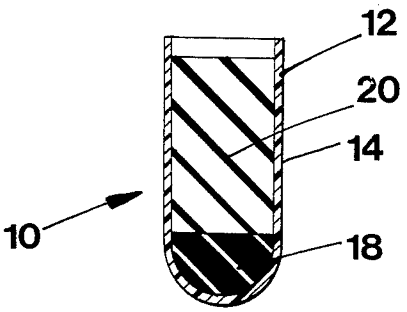
FIG. 3 is an enlarged side sectional view taken along Section 3—3 as indicated in FIG. 2.

As illustrated in FIG. 3, capsule 12 encloses a core 18 and a time-measuring volatilizable plug 20. Core 18 is a composition including a flowable colorant mixed with a sublimable substance. The flowable colorant will begin to be released automatically after the predetermined elapsed time, as measured by the volatilization of plug 20, has passed. Plug 20 is a sublimable substance which prior to its sublimation serves to contain the flowable colorant within capsule 12, and which by its sublimation serves to expose core 18 to the atmosphere to allow the colorant to flow gradually out of capsule 12 as the sublimable core substance volatilizes.

Sublimable plug 20 and container wall 14 together form an enclosure means for the flowable colorant. Container wall 14 is designed in a manner limiting the surface area of the sublimable plug which is exposed to the surrounding atmosphere. This tends to restrict and control the rate at which sublimable plug 20 volatilizes to the atmosphere, thus promoting accuracy in the elapsed time indicator.

The ideal size and shape of the plug (or other volatilizable enclosure portion), the proper amount of core composition, and the proper concentration of colorant in the core are all dependent on a variety of factors. The size of the surface area to be colored by a flowable colorant, the intensity of the coloring desired, the abruptness of the color change desired, and, most importantly, the length of the predetermined time period to be measured by volatilization of the plug (or other volatilizable enclosure portion) are among the factors to be considered in making these choices. Obviously, a number of reasonable trade-offs are possible in product planning.

The preparation of capsule 12 is simple, requiring only readily available materials and substances. The composition for core 18 may include para-dichlorobenzene and a powdered dye such as that known as "Fat Blue B." The composition for plug 20 is pure para-dichlorobenzene. A standard #00 rigid gelatin capsule is used.

Para-dichlorobenzene crystals are heated to a molten state, and a portion is set aside for use in forming plug 20. The powdered dye is intermixed with the remainder of the molten para-dichlorobenzene to form the composition for core 18. The amount of dye in this mixture can be varied greatly. Greater dye concentrations are desirable if a large surface must be colored upon release of the dye. For an air freshener product of the type having about 15 grams of perfume-impregnated beads approximately 3 mm in diameter, if a #00 capsule is used and filled with a 0.25 grams of core composition it is preferred to use a dye concentration of less than about 1% in the core composition.

About 0.25 grams of this core composition is filled into the #00 capsule using a piston-type filler together with standard capsule-handling equipment. After core 18 has solidified, about 0.85 grams of the pure molten para-dichlorobenzene is filled into the capsule over core 18 to form plug 20. Then, after solidification of plug 20, capsule cover 16 is put in place to keep the sublimable contents from volatilizing during the period prior to activation.

Figure 4:
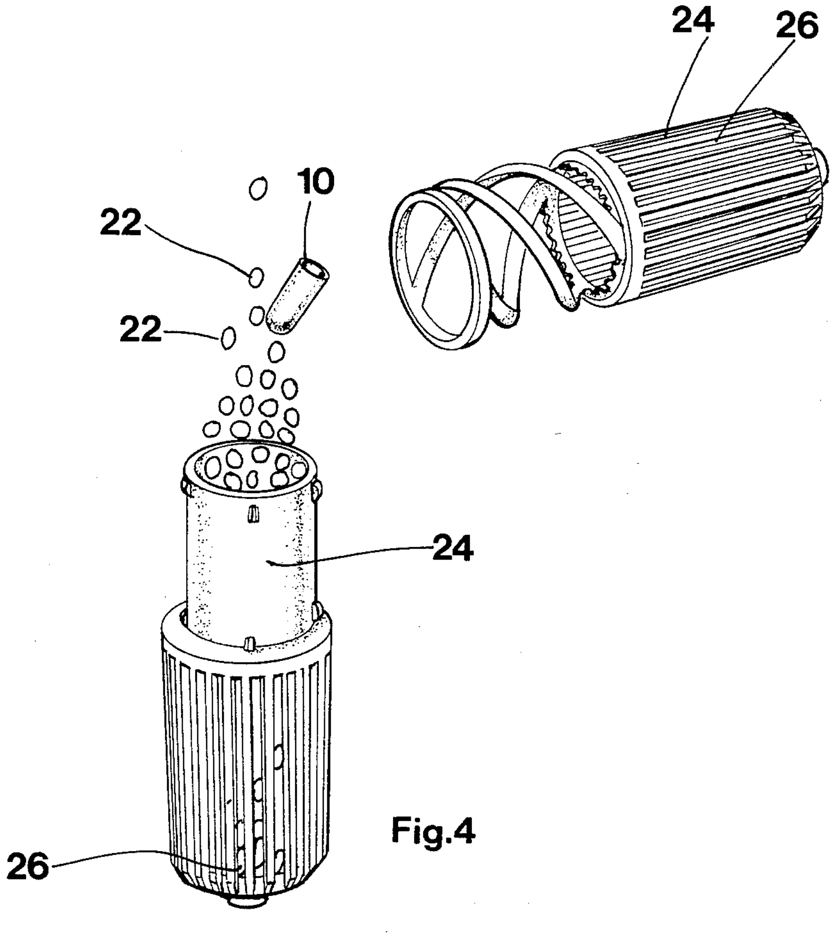
FIG. 4 is a disassembled perspective view of an air freshener device including an elapsed time indicator in accordance with this invention.

FIG. 4 illustrates an air freshener product of the type including the aforementioned polymeric beads. Beads 22 are loaded into a tubular container 24 (shown disassembled, in two parts) and tumbled therein as such container is rotated. FIG. 4 illustrates that an elapsed time indicator 10, after its cover 16 has been removed, is inserted into tubular container 24 such that it will tumble with beads 22. When sublimable plug 20 has volatilized sufficiently to expose core 18, the sublimation of the sublimable core substance will quickly release the contained flowable colorant such that it covers the surfaces of beads 22.

A flowable colorant which is soluble in the perfume composition within beads 22 is highly preferred. This provides the advantages previously described relating to thorough and relatively even coverage of the outer surfaces of beads 22. When the flowable colorant thus colors the surfaces of beads 22, such color change can readily be viewed through the openings 26 in the walls of tubular container 24. Thus, the need to replace beads 22 will be clearly signaled to the user.

Highly preferred sublimable substances for plug 20 include para-dichlorobenzene, 2,4,6-triisopropyl-1,3,5-trioxane, camphor, and napthalene. Para-dichlorobenzene is most preferred because it is readily available at low cost, sublimes at a rate which is appropriate for many air freshener products, and is relatively constant in its rate of volatilization over wide temperature and humidity ranges.

Other sublimable substances which can be used include 1,2,3-trichlorobenzene, menthol, acetamide, diphenylethane, hexachloroethane, benzophenone, benzyl cinnamate, benzyl isoeugenol, benzylidene acetone, cedrol, cinnamic alcohol, coumarin, hydroquinone dimethyl ether, acetyl isoeugenol, methyl cinnamate, methyl coumarin, napthyl ethyl ether, thymol. The choice of a volatilizable substance to use in any embodiment of this invention is dependent upon a number of factors, including the type of indicator to be used, the length of the predetermined time, and the shape of the enclosure. Referring to the consideration of the length of time, it is noted that 2,4,6-triisopropyl-1,3,5-trioxane sublimes very slowly and is useful for indicating an extended elapsed period, for example, six months. Para-dichlorobenzene is useful for much shorter periods, and napthalene can be a good replacement for para-dichlorobenzene.

Sublimable substances for use in the core composition are preferably substances which volatilize quickly. A desirable rate of volatilization depends on, among other things, the intended use of the elapsed time indicator. For an air freshener, para-dichlorobenzene, napthalene, and camphor are preferred.

A wide variety of flowable colorants would be acceptable. Included among these are powdered dyes known as Fat Blue B and Fat Red BB, both from Hoechst Canada Inc., in Montreal, Canada. Oil Blue #712 and Oil Yellow #36, both from Soda Aromatics Co. Ltd., in Tokyo, Japan, are other examples of suitable flowable colorants.

While in the foregoing specification this invention has been described in relation to certain preferred embodiments and the details have been set forth for purpose of illustration, it will be apparent to those skilled in the art that the invention is susceptible to additional embodiments and that certain of the details described herein can be varied considerably without departing from the basic principles of the invention.

What is claimed is:

1. An indicator to signal the passage of a predetermined, approximate time, comprising:

flowable colorant indicator means; and means enclosing said indicator means, at least a portion of said enclosure means consisting of a substance adapted to volatilize during passage of the predetermined approximate time to release said indicator means from said enclosure means thus providing an indication of the passage of the predetermined approximate time;

said flowable colorant indicator means being intermixed with and held in a sublimable core substance to define a core, said core being disposed within said enclosure means.

2. The indicator of claim 1 wherein said volatilizable substance is sublimable.

3. The indicator of claim 2 wherein said volatilizable substance is selected from a group consisting of para-dichlorobenzene, 2,4,6-triisopropyl-1,3,5-trioxane, camphor, and napthalene.

4. The indicator of claim 1 wherein said flowable colorant indicator means is a powdered dye.

5. The indicator of claim 1 wherein said sublimable core substance is selected from a group consisting of camphor, napthalene, and para-dichlorobenzene.

6. The indicator of claim 5 wherein the volatilizable substance of said enclosure means is selected from a group consisting of para-dichlorobenzene, 2,4,6-triisopropyl-1,3,5-trioxane, camphor, and napthalene.

7. The indicator of claim 2 further including a deposit surface adjacent to said enclosure means to receive said flowable colorant indicator means upon release thereof from said enclosure means.

8. The indicator of claim 7 wherein said deposit surface includes a solvent for said flowable colorant indicator means.

9. The indicator of claim 2 wherein said enclosure means includes a container wall limiting exposure of said sublimable substance and thereby limiting its rate of volatilization.

10. An indicator to signal the passage of a predetermined approximate time, comprising:

indicator means; and means enclosing said indicator means, at least a portion of said enclosure means being a volatilizable substance whereby after substantially complete volatilization of said substance said indicator means is effective, said enclosure means including a container wall limiting the rate of volatilization of said volatilizable substance, said indicator means including a sublimable core substance to define a core, said core being disposed within said enclosure means.

11. The indicator of claim 10 wherein said indicator means is a flowable colorant.

12. The indicator of claim 11 wherein said flowable colorant is a powdered dye.

13. The indicator of claim 10 wherein said colorant is in a core, intermixed with and held in a sublimable core substance, said core being within said enclosure means.

14. The indicator of claim 13 wherein said volatilizable substance of said enclosure means is selected from a group consisting of para-dichlorobenzene, 2,4,6-triisopropyl-1,3,5-trioxane, camphor, and napthalene.

15. The indicator of claim 14 wherein said sublimable core substance is selected from a group consisting of camphor, napthalene, and para-dichlorobenzene.

16. The indicator of claim 11 further including a deposit surface adjacent to said enclosure means to receive said indicator means upon release thereof from said enclosure means.

17. The indicator of claim 16 wherein said deposit surface includes a solvent for said flowable colorant.

* * * * *